United States Patent
Pionetti

(10) Patent No.: US 10,658,785 B2
(45) Date of Patent: May 19, 2020

(54) METHOD FOR CONNECTING CABLES OF A PIPELINE UNIT SECTION TO BE VERTICALLY JOINED TO A SUBSEA PIPELINE FOR TRANSPORTING FLUIDS

(71) Applicant: SAIPEM S.A., Montigny le Bretonneux (FR)

(72) Inventor: François-Régis Pionetti, La Baleine (FR)

(73) Assignee: Saipem S.A., Montigny le Bretonneux (FR)

( * ) Notice: Subject to any disclaimer, the term of this patent is extended or adjusted under 35 U.S.C. 154(b) by 291 days.

(21) Appl. No.: 15/550,637

(22) PCT Filed: Feb. 5, 2016

(86) PCT No.: PCT/FR2016/050255
§ 371 (c)(1),
(2) Date: Aug. 11, 2017

(87) PCT Pub. No.: WO2016/128656
PCT Pub. Date: Aug. 18, 2016

(65) Prior Publication Data
US 2018/0034193 A1   Feb. 1, 2018

(30) Foreign Application Priority Data
Feb. 11, 2015 (FR) ...................... 15 51095

(51) Int. Cl.
*H01R 13/523* (2006.01)
*H01R 13/52* (2006.01)
(Continued)

(52) U.S. Cl.
CPC .......... *H01R 13/5202* (2013.01); *F16L 1/19* (2013.01); *F16L 25/01* (2013.01); *F16L 53/38* (2018.01);
(Continued)

(58) Field of Classification Search
CPC .......... H01R 13/6205; H01R 13/53202; H01R 4/18; H01R 4/56; H01R 43/26;
(Continued)

(56) References Cited

U.S. PATENT DOCUMENTS 2,893,490 A * 7/1959 Williams ............... E21B 36/04
166/60
3,652,196 A * 3/1972 Marion ............... E21B 41/0071
431/202
(Continued)

FOREIGN PATENT DOCUMENTS

WO   WO 01/96706   12/2001
WO   WO 03/102455  12/2003

OTHER PUBLICATIONS

"Insulation Production pipe Heating wires Outer Pipe" Dec. 31, 2014 XP055226135, http://www.subsea7.com/content/dam/subsea7/documents/technologyandassets/4_Pg_Leaflet_High-performand_PIP_Reference.pdf.
(Continued)

*Primary Examiner* — Peter Dungba Vo
*Assistant Examiner* — Kaying Kue
(74) *Attorney, Agent, or Firm* — Cozen O'Connor

(57) ABSTRACT

A method of connecting cables of a unitary pipe section that is to be assembled vertically to an undersea fluid transport pipe, by positioning around a low end of the unitary pipe section (40) a female annular connector (2) having connected thereto cables (14) extending along the unitary pipe section; positioning around a high end of the pipe (42) a male annular connector (24) having connected thereto cables (32) extending along the pipe; and connecting together the male and female connectors by sliding them vertically towards each other while assembling the unitary pipe section on the pipe.

12 Claims, 3 Drawing Sheets

(51) Int. Cl.
  *F16L 53/38* (2018.01)
  *F16L 1/19* (2006.01)
  *F16L 25/01* (2006.01)
  *H02G 9/06* (2006.01)
  *H01R 4/18* (2006.01)
  *H01R 4/56* (2006.01)
  *H01R 13/62* (2006.01)
  *H01R 43/26* (2006.01)

(52) U.S. Cl.
  CPC ............... *H01R 4/18* (2013.01); *H01R 4/56* (2013.01); *H01R 13/6205* (2013.01); *H01R 43/26* (2013.01); *H02G 9/06* (2013.01)

(58) Field of Classification Search
  CPC ........ H01R 13/5202; F16L 53/38; F16L 1/19; F16L 25/01
  USPC ................. 29/428, 611, 235, 234, 828, 869, 29/890.036, 890.032, 726, 282, 89, 0.14, 29/890.14, 890.141
  See application file for complete search history.

(56) References Cited

U.S. PATENT DOCUMENTS

| | | | | |
|---|---|---|---|---|
| 4,429,213 A * | 1/1984 | Mathieu | ................ | F16L 55/103 392/468 |
| 4,607,469 A * | 8/1986 | Harrison | ................ | F16L 5/02 138/89 |
| 4,791,277 A * | 12/1988 | Montierth | ................ | E03B 7/12 219/535 |
| 4,817,259 A * | 4/1989 | Hata | ................ | B21C 23/22 29/424 |
| 5,007,852 A | 4/1991 | Dean et al. | | |
| 5,070,597 A * | 12/1991 | Holt | ................ | F16L 5/02 138/103 |
| 5,086,836 A * | 2/1992 | Barth | ................ | C09K 5/08 137/340 |
| 5,241,147 A * | 8/1993 | Ahlen | ................ | F16L 53/004 219/629 |
| 5,692,918 A * | 12/1997 | Hill | ................ | G01V 1/208 439/323 |
| 6,289,985 B1 * | 9/2001 | Meynier | ................ | G01V 1/52 166/60 |
| 6,364,022 B1 * | 4/2002 | Kodaissi | ................ | E21B 17/015 166/367 |
| 7,523,766 B2 * | 4/2009 | Chenin | ................ | F16L 9/045 138/114 |
| 7,677,579 B2 * | 3/2010 | Bell | ................ | F16L 7/02 277/607 |
| 7,860,377 B2 * | 12/2010 | Vinegar | ................ | C07C 4/02 166/302 |
| 8,319,626 B1 * | 11/2012 | Cantolino | ................ | G08B 21/20 122/13.01 |
| 9,936,540 B1 * | 4/2018 | Myers | ................ | H05B 3/56 |
| 2003/0038130 A1 * | 2/2003 | Thomas | ................ | H05B 6/14 219/632 |
| 2005/0016769 A1 | 1/2005 | Wallace | | |
| 2005/0232703 A1 * | 10/2005 | Saint-Marcoux | ........ | E21B 17/01 405/154.1 |
| 2005/0241717 A1 * | 11/2005 | Hallot | ................ | F16L 59/143 138/149 |
| 2006/0231266 A1 * | 10/2006 | Rodrigues | ............... | E21B 43/01 166/365 |
| 2009/0065083 A1 * | 3/2009 | Mei | ................ | E21B 17/003 138/109 |
| 2009/0129853 A1 * | 5/2009 | Pionetti | ................ | B05D 1/002 403/23 |
| 2009/0159278 A1 | 6/2009 | Corre et al. | | |
| 2010/0089584 A1 * | 4/2010 | Burns | ................ | H01C 3/00 166/302 |
| 2011/0073585 A1 * | 3/2011 | Sinault | ................ | F16L 53/38 219/541 |
| 2013/0014833 A1 * | 1/2013 | Geertsen | ................ | H05B 6/56 137/341 |
| 2014/0014870 A1 * | 1/2014 | Pionetti | ................ | F16L 59/14 252/62 |
| 2014/0116556 A1 * | 5/2014 | Critsinelis | ................ | F16L 9/19 138/97 |
| 2014/0367959 A1 * | 12/2014 | Lynch | ................ | F16L 41/021 285/133.11 |
| 2015/0176831 A1 * | 6/2015 | Zhang | ................ | F21V 23/06 362/294 |
| 2015/0285409 A1 * | 10/2015 | Espinasse | ............ | F16L 59/025 138/149 |

OTHER PUBLICATIONS

Office Action dated May 15, 2018 issued in the corresponding Australian Patent Application No. 2016217747.
TECHNIP: "Electrically trace-heated PIP system advances subsea development," Offshore, Offshore Magazine, Nov. 4, 2013, 11 pages.

\* cited by examiner

METHOD FOR CONNECTING CABLES OF A PIPELINE UNIT SECTION TO BE VERTICALLY JOINED TO A SUBSEA PIPELINE FOR TRANSPORTING FLUIDS

PRIORITY CLAIM

This is a U.S. national stage of application No. PCT/FR2016/050255, filed on Feb. 5, 2016. Priority is claimed on France Application No. FR1551095, filed Feb. 11, 2015, the content of which is/are incorporated here by reference.

BACKGROUND OF THE INVENTION

The present invention relates to the general field of fluid transport pipes, and in particular to undersea pipes, resting on the sea bottom or providing a bottom-to-surface connection for transferring hydrocarbons, e.g. oil and gas, coming from undersea production wells.

The invention relates to pipes of all types, and in particular to coaxial pipes of the pipe in pipe (PIP) type, where an inner tube transports the fluid and an outer tube coaxial around the inner tube, and also referred to as the "outer envelope", is in contact with the surrounding medium, i.e. water.

In general, these coaxial pipes are assembled on land to constitute elements of unit length (known as double, triple, or quadruple joints, and referred to below as "quad-joints" for quadruple sections of tube), having length of the order of 10 meters (m) to 100 m, depending on the loading capacity of the laying system. Such quad-joints are then transported to sea on a laying vessel.

During laying, the quad-joints are connected to one another on board the vessel while they are being laid at sea. Laying may be performed via a J-lay tower positioned on the laying vessel. With J-laying, the undersea pipe is typically lowered from the laying vessel practically vertically (at an angle in the range +30° to −10° relative to the vertical). J-laying comprises simple catenary laying in which the quasi-vertical angle of inclination of the pipe diminishes progressively on going down towards the bottom where it matches the slope of the sea bottom.

The J-laying method makes it necessary to move each quad-joint from a horizontal position (along the deck of the laying vessel) to a vertical position in order to align it with the J-lay tower. The quad-joint is held vertically by the laying tower in order to enable its bottom end to be welded to the top end of the pipe. Once the quad-joint has been welded to the pipe, the quad-joint is lowered into the sea while moving the laying vessel forwards by an amount corresponding to the length of the quad-joint.

Furthermore, it is known to place cables in the annular space between the two tubes of such undersea coaxial pipes so that the cables run along the inner tube over their entire length.

These cables are constituted in particular by electric cables that are wound around the inner tubes of pipes in order to heat them by the Joule effect. This technique is known as heat tracing and serves to ensure that the fluids transported in undersea pipes are maintained at a temperature above a critical threshold all along their paths from the production well to a surface installation (so as to avoid the appearance of troublesome phenomena in the pipes and so as to maintain good flow conditions).

Unfortunately, when J-laying a new quad-joint on the undersea pipe, the problem arises of making connections between the cables of the pipe and the cables of the new quad-joint. Given the vertical position of the tubes during such laying, it is necessary in particular to ensure that connecting the cables is simple, fast, and effective.

OBJECT AND SUMMARY OF THE INVENTION

A main object of the present invention is thus to provide a connection method that is simple, fast, and effective.

In accordance with the invention, this object is achieved by a method of connecting cables of a unitary pipe section that is to be assembled vertically to an undersea fluid transport pipe, the method comprising:

positioning around a low end of the unitary pipe section a female annular connector having connected thereto cables extending along said unitary pipe section;

positioning around a high end of the pipe a male annular connector having connected thereto cables extending along said pipe; and connecting together the male and female connectors by sliding them vertically towards each other while assembling the unitary pipe section on the pipe.

Having recourse to male and female connectors to which the cables of the unitary pipe section and the cables of the pipe are connected makes it possible in reliable and effective manner to connect these cables together (e.g. electrically). In particular, once the unitary pipe section has been connected to the pipe, it suffices to cause the female connector (and/or the male connector) to slide vertically so as to connect them together and provide a connection between the cables. Electrical continuity between the cables is thus established in a manner that is simple, fast, and effective, thus making it possible to avoid increasing the length of time during which laying vessels are used.

It should also be observed that the female connector is advantageously selected to be placed in a high position during assembly so that the bushings that are to connect with the pins of the male connector face downwards, thereby limiting any risk of them becoming contaminated with foreign bodies.

Preferably, the method further comprises, after connecting together the male and female connectors, pivoting said connected-together connectors around a longitudinal axis of the unitary pipe section. This manipulation thus makes it possible to press the cables against an outside surface of said unitary pipe section, so as to avoid interfering with the heating effectiveness of the cables.

Also preferably, the method further includes injecting resin into the inside of an annular cavity formed between the male and female connectors when they are assembled together so as to provide electrical insulation for the connection between said connectors (this operation is typically performed off shore).

Likewise, the cables are connected to the male and female connectors by advantageously injecting resin into the insides of internal cavities of said connectors so as to provide electrical insulation of the connection of the cables where they are connected to said connectors (this operation is typically performed on shore).

Also preferably, the method further includes holding at least the female connector on the unitary pipe section by means of a magnet to hold it vertically on the unitary pipe section and so as to prevent it from sliding vertically along the pipe section under the effect of gravity.

The cables may be connected to the male and female connectors by screwing shanks that are crimped to the ends of the cables to said connectors. Furthermore, the cables may be connected to the male and female connectors while being regularly spaced around a longitudinal axis of the unitary pipe section.

The invention also provides a male connector for performing the above-defined method, comprising a ring having an internal cavity in which a plurality of pins are received for connecting cables.

The invention also provides a female connector for performing the above-defined method, comprising a ring having an internal cavity into which the ends of the cables for connection lead.

The internal cavity of the ring of each of these connectors preferably opens out to the outside via at least one opening to enable resin to be injected into its inside. Furthermore, the rings of these connectors advantageously include at least one magnet on an inside face.

BRIEF DESCRIPTION OF THE DRAWINGS

Other characteristics and advantages of the present invention appear from the following description given with reference to the accompanying drawings which show an embodiment having no limiting character. In the figures.

DETAILED DESCRIPTION OF THE INVENTION

The invention applies to any type of fluid transport pipe, and in particular to undersea coaxial pipes of the pipe-in-pipe (PIP) type, i.e. a pipe that comprises an inner tube for transporting hydrocarbons coming from production wells and an outer tube coaxial around the inner tube and also referred to as the "outer envelope", which is in direct contact with the surrounding water.

This type of undersea coaxial pipe is typically used in the offshore production of hydrocarbons at great depths. In the context of such installations, undersea coaxial pipes can be assembled on land as a plurality of pipe sections of unit length (also referred to as "joints", in particular "double joints" for two unit elements assembled together, "triple joints" for three unit elements assembled together, and "quadruple joints" for four unit elements assembled together, or more generically "quad-joint" for quadruple tube sections), of the order of 10 m to 100 m, depending on the loading capacity of the laying system. During laying, these unit length elements of undersea pipe are connected to one another on board the vessel progressively as they are laid in the sea.

Typically, the inner tube of such coaxial pipes is covered in electrical and/or optical cables. The electrical cables are used in particular for providing Joule effect heating of the inner tubes so as to avoid troublesome phenomena occurring inside the tubes that can impede good flow of the fluids. Optical cables may be used in particular for collecting a certain amount of data concerning the temperature and/or the stresses to which the undersea pipe is subjected in operation.

The method of the invention seeks to provide connections between the (electrical and/or optical) cables at a new quad-joint (or new unit section of pipe) that is to be assembled to the undersea pipe with its own (electrical and/or optical) cables; the new quad-joint is assembled with the undersea pipe vertically at sea in a J-lay tower.

For this purpose, the invention makes provision for positioning a female connector (as described below with reference to FIGS. 1 to 3) around a low end of a new quad-joint and a male connector (as described below with reference to FIGS. 4 to 6) around a high end of the undersea pipe.

Figure 2:
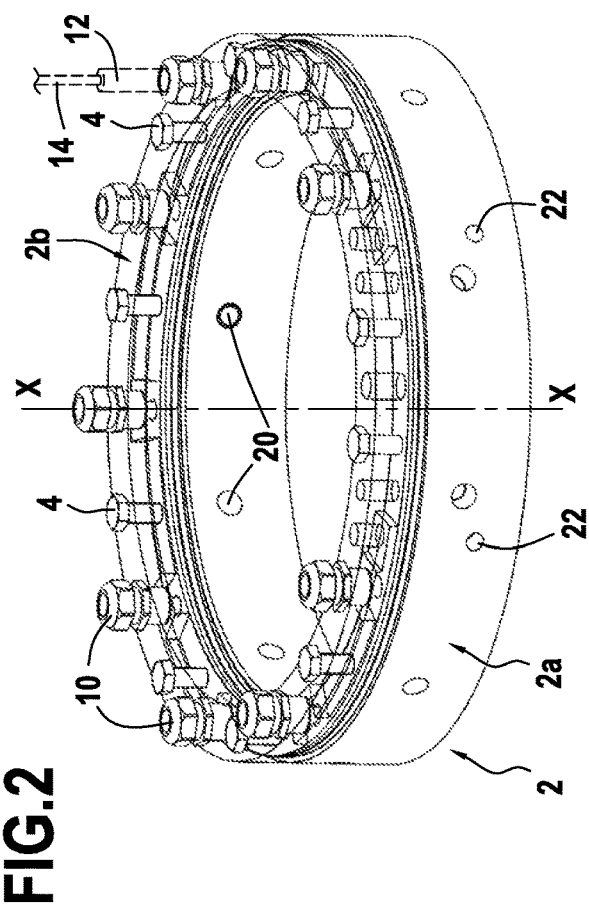
FIGS. 1 to 3 are views of a female connector used in the connection method of the invention, seen respectively in exploded view, in perspective view, and in profile view.
Figure 3:
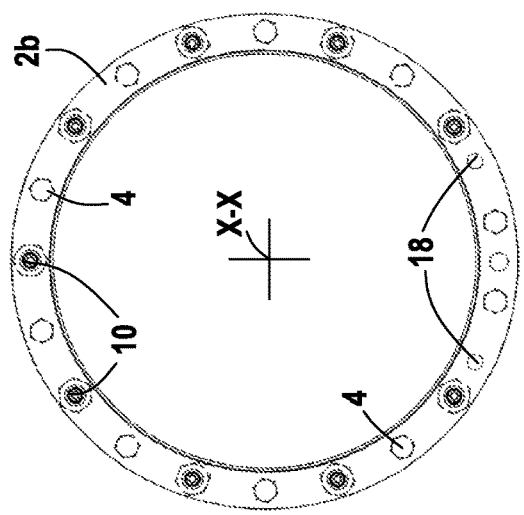
Figure 1:
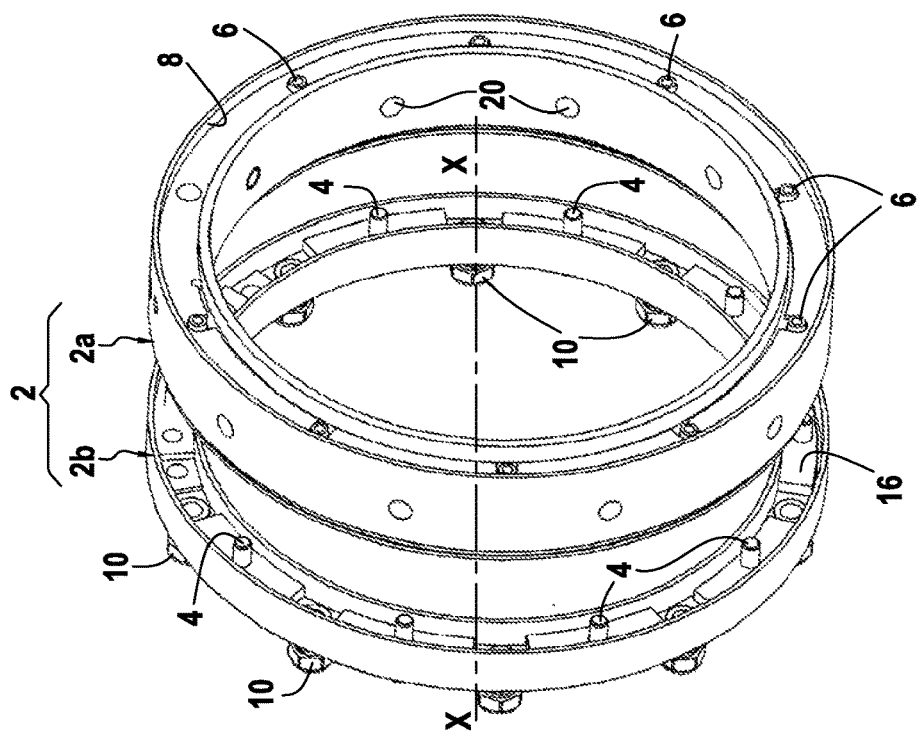

As shown in FIGS. 1 to 3, the female connector 2 is in the form of a ring having a longitudinal axis X-X and made up of two annular portions 2a and 2b, e.g. made of plastics material, that are assembled together by pegs 4 that are regularly spaced apart around the axis X-X.

In its portion 2a, the female connector has a plurality of bushings 6 that are regularly distributed around the axis X-X and that open to the outside of the female connector in an annular setback 8.

In its portion 2b, the female connector has a plurality of screw fastener nuts 10 regularly distributed around the axis X-X and in longitudinal alignment with the bushings 6, with which they are in (electrical and/or optical) contact. These nuts 10 are to receive screw fastening shanks 12 crimped to the free ends of the cables 14 for connection.

Furthermore, as shown in FIG. 1, the portion 2b has an internal annular cavity 16 formed facing the portion 2a of the female connector and opening to the outside thereof via two openings 18 (see FIG. 3: one of the openings 18 serving to enable the internal cavity 16 to be evacuated and the other serving to inject resin therein).

In its inside face, the female connector 2 also has a plurality of magnets 20 for fastening vertically on the unitary pipe section (which is made of metal) and for preventing it from sliding vertically therealong under the effect of gravity.

Finally, in its outside face, the female connector also has two holes 22 opening to the outside and to the inside of the annular setback 8 where the bushings 6 open out (see FIG. 2: one of these holes 22 is used for evacuating and the other for injecting resin).

Figure 5:
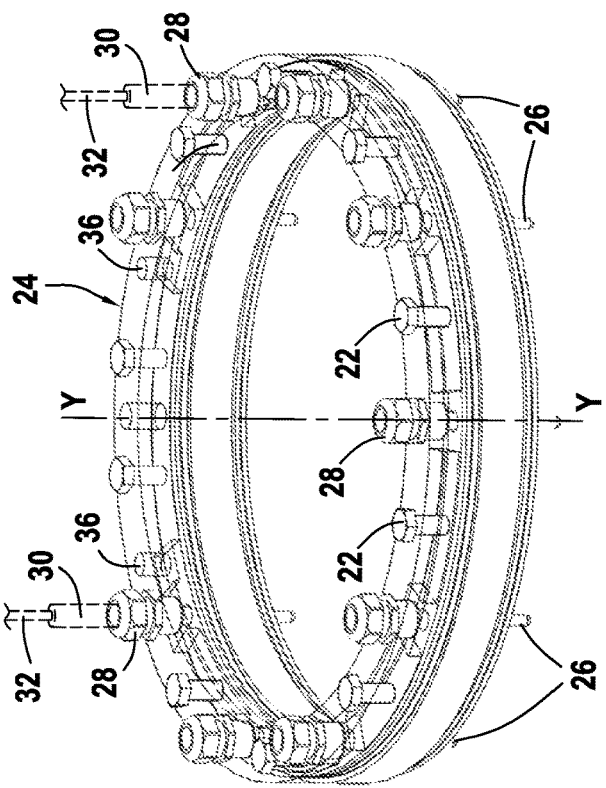
FIGS. 4 to 6 are views of a male connector used for the connection method of the invention, seen respectively in exploded view, in perspective view, and in profile view.
Figure 6:
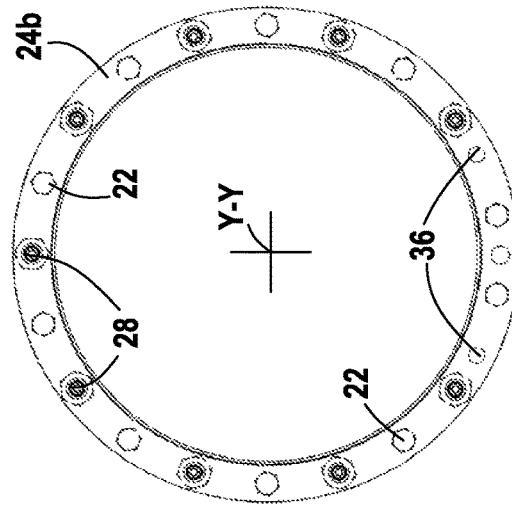
Figure 4:
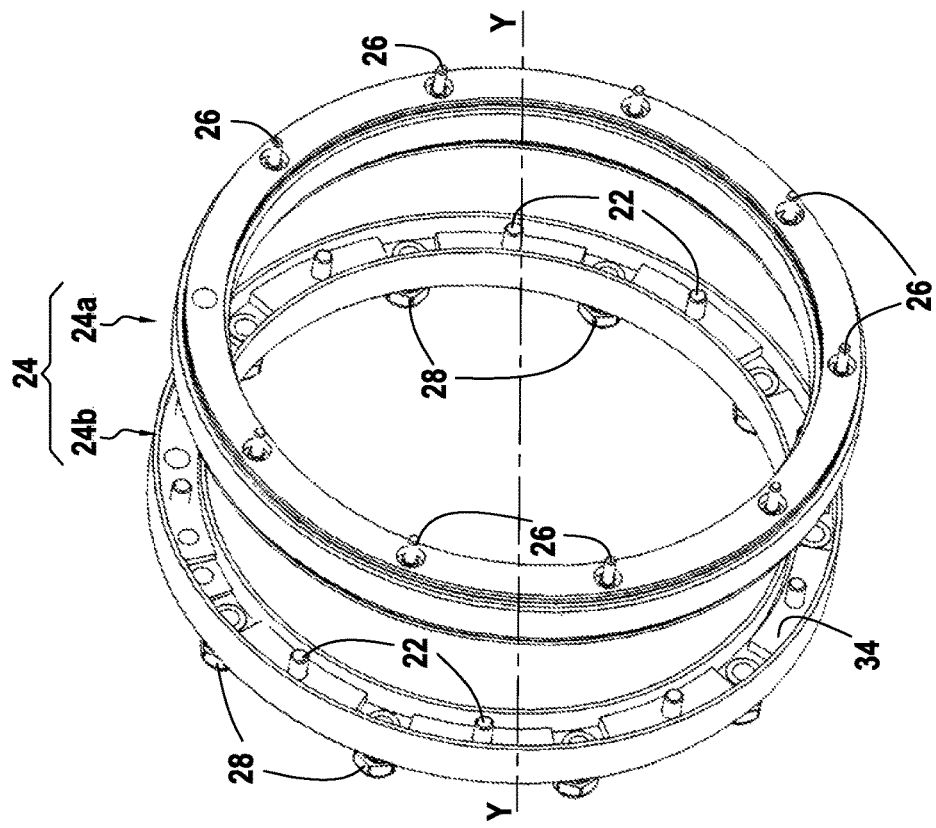

As shown in FIGS. 4 to 6, the male connector 24 is in the form of a ring having a longitudinal axis Y-Y and likewise made up of two annular portions 24a and 24b, e.g. made of plastics material, and assembled together by pegs 22 regularly distributed around the axis Y-Y.

In its portion 24a, the male connector 24 has a plurality of pins 26 regularly distributed around the axis Y-Y and leading to the outside of the male connector by projecting longitudinally outwards relative therefrom (it should be observed that the number of pins 26 is naturally identical to the number of bushings 6 of the female connector).

In its portion 24b, the male connector has a plurality of screw fastener nuts 28 that are regularly distributed around the axis X-X and longitudinally in alignment with the pins 26 with which they are in (electrical and/or optical) contact. These nuts 28 are for receiving screw fastener shanks 30 crimped to the free ends of the cables 32 for connection.

Furthermore, and as shown more precisely in FIG. 4, the portion 24b has an inside annular cavity 34 formed facing the portion 24a of the male connector and opening the outside thereof via two openings 36 (see FIG. 6: one of the openings is used for evacuating the internal cavity 34 and the other for injecting resin therein).

The method of connecting the (electrical and/or optical) cables of a new quad-joint with the cables of the undersea pipe by means of the above-described female and male connectors 2 and 24 is described below with reference to FIGS. 7A to 7C.

Prior to this operation, the female connector 2 is positioned around a low end of the inner tube 40a of the new quad-joint 40 for assembling (with the female connector being held in this position being provided by the magnets 20 positioned on its inside face) and the electrical and/or optical cables 14 extending along the quad-joint 40 are connected to the female connector. In this position, the pins of the female connector face downwards.

As mentioned above, the shanks 12 crimped to the free ends of these cables 14 are more precisely screwed into the nuts 10 of the female connector. Once the cables 14 have been connected to the female connector, resin (typically epoxy resin) is injected into the inside of the internal cavity of the female connector (via the openings 18) so as to provide good electrical insulation of the cables where they are connected to the female connector (this operation is performed on shore).

Likewise, the male connector 24 is positioned around the inner tube 42a of the pipe 42 onto which the quad-joint 40 is to be assembled, and the electrical and/or optical cables 32 extending along the pipe are connected to the male connector. In this position, the pins of the male connector point upwards.

For this purpose, the shanks 30 crimped onto the free ends of these cables 32 are specifically screwed into the nuts 28 of the male connector and resin (typically epoxy resin) is likewise injected into the inside of the internal cavity of the connector (via the openings 36) so as to provide good electrical insulation for the cables where they are connected to the male connector (this operation is performed on shore).

Figure 7A:
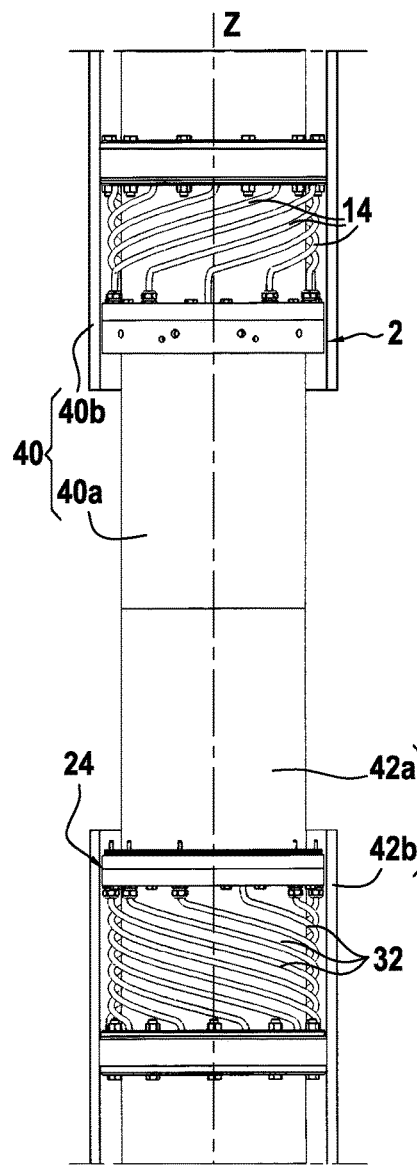
FIGS. 7A to 7C are views of an implementation of the connection method of the invention.

As shown in Figure FIG. 7A, the new quad-joint 40 for assembling is then positioned vertically above the undersea pipe 42 by means of a J-lay tower (not shown). More precisely, the respective inner tubes 40a and 42a of the quad-joint 40 and of the undersea pipe 42 are assembled together (by welding), after the respective outer tubes 40b and 42b have previously been slid apart vertically in order to enable this operation to be performed.

Figure 7B:
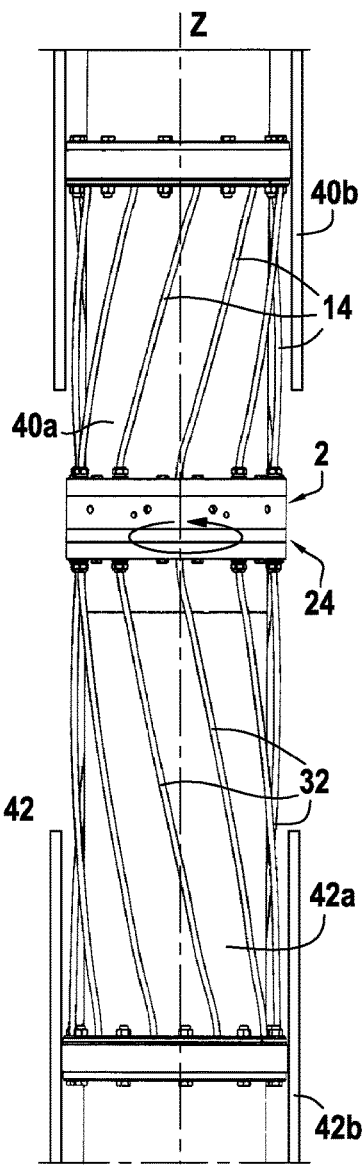
Figure 7C:
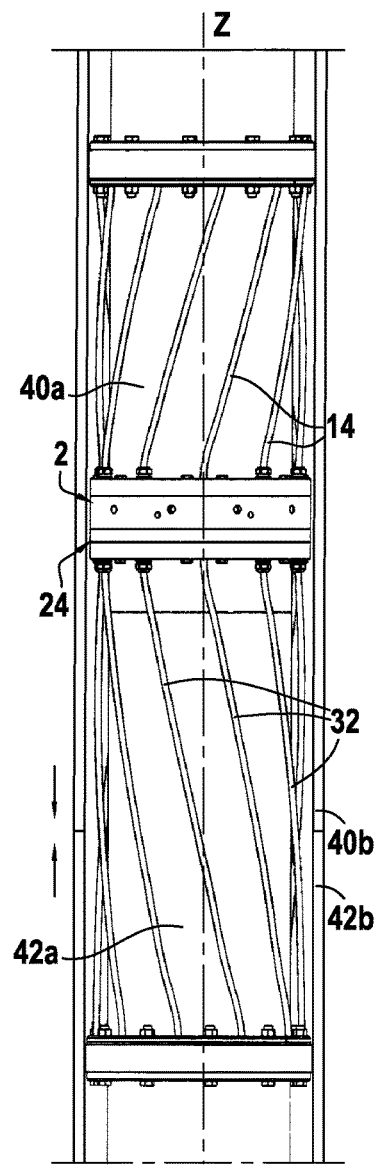

Once the respective inner tubes 40a, 42a of the quad-joint 40 and of the pipe 42 have been assembled together, the female and/or male connectors 2 and 24 are slid vertically along the quad-joint and along the pipe in order to enable them to be connected together (i.e. in order to enable the pins of the male connector and/or the bushings of the female connector to be electrically and/or optically connected together)—see FIG. 7B. By using sufficient force, it is possible to slide the female connector in spite of the presence of magnets on its inside face.

In this position, resin (typically epoxy resin) is injected into the internal annular cavity formed between the annular setback 8 of the female connector 2 and the portion 24a of the male connector 24 provided with the pins 26 via the holes 22 (this operation is performed off shore). The resin serves firstly to provide good electrical insulation between the bushings of the female connector and the pins of the male connector, and secondly to provide secondary fastening between the connectors.

Where necessary, the female and male connectors 2 and 24 as connected together in this way are advantageously pivoted around a longitudinal axis Z-Z of the quad-joint 40 so as to press the cables 14 properly against an outside surface of the quad-joint and the cables 32 against an outside surface of the pipe 42. Finally, once the female and male connectors 2 and 24 have been connected together, the respective outer tubes 40b, 42b of the quad-joint 40 and of the undersea pipe 42 are slid vertically towards each other in order to enable them to be connected together (FIG. 7C).

It should be observed that the female and male connectors as connected together in this way are preferably longitudinally offset relative to the welding between the respective outer tubes of the quad-joint and of the pipe. Specifically, deformation of the weld might damage the connectors.

It should also be observed that the male and female connectors and the connection method of the invention are described herein with reference to a coaxial pipe of the PIP type. Naturally, the present invention applies equally well to any other fluid transport pipe, in particular to single pipes covered in composite materials.

The invention claimed is:

1. A method of connecting cables of a unitary pipe section that is to be assembled vertically to an undersea fluid transport pipe, the method comprising:
    positioning around a low end of said unitary pipe section a female annular connector having connected thereto first cables extending along said unitary pipe section, said female annular connector including a plurality of bushings at a lower annular portion;
    positioning around a high end of said fluid transport pipe a male annular connector having connected thereto second cables extending along said fluid transport pipe, said male annular connector including a plurality of pins at an upper annular portion; and
    connecting together said male annular connector and said female annular connector by rotationally aligning them with respect to each other such that the plurality of pins are received in the plurality of bushings, and sliding said male annular connector and said female annular connector vertically towards each other while assembling said unitary pipe section onto said fluid transport pipe.

2. The method according to claim 1, further comprising, after connecting together said male annular connector and said female annular connector, pivoting said connected-together said male annular connector and said female annular connector around a longitudinal axis (Z-Z) of said unitary pipe section to press the cables against an outside surface of said unitary pipe section.

3. The method according to claim 1, further comprising injecting resin into the inside of an annular cavity formed between said male annular connector and said and female annular connector when they are assembled together so as to provide electrical insulation for the connection between said male annular connector and said female annular connector.

4. The method according to claim 1, wherein said first cables and said second cables are connected to said male annular connector and said female annular connector by injecting resin into the insides of internal cavities of said male annular connector and said female annular connector so as to provide electrical insulation of the connection of the cables where they are connected to said male annular connector and said female annular connector.

5. The method according to claim 1, further comprising holding at least said female annular connector on said unitary pipe section by means of a magnet so as to prevent said female annular connector from sliding vertically along said pipe section under the effect of gravity.

6. The method according to claim 1, wherein the said cables are connected to said male annular connector and said female annular connector by screwing shanks that are crimped to the ends of said cables to said male annular connector and said female annular connector.

7. The method according to claim 1, wherein said cables are connected to said male annular connector and said female annular connector while being regularly spaced around a longitudinal axis of said unitary pipe section.

8. A male annular connector for performing a method of connecting cables of a unitary pipe section that is to be assembled vertically to an undersea fluid transport pipe, the method comprising:

positioning around a low end of said unitary pipe section a female annular connector having connected thereto first cables extending along said unitary pipe section, said female annular connector including a plurality of bushings at a lower annular portion;

positioning around a high end of said fluid transport pipe said male annular connector having connected thereto second cables extending along said fluid transport pipe, said male annular connector including a plurality of pins at an upper annular portion; and connecting together said male annular connector and said female annular connector by rotationally aligning them with respect to each other such that the plurality of pins are received in the plurality of bushings, and sliding said male annular connector and said female annular connector vertically towards each other while assembling said unitary pipe section onto said fluid transport pipe, wherein said male annular connector comprises a ring having an internal cavity in which a plurality of pins are received for connecting at least one of said first cables and said second cables.

9. The male annular connector according to claim 8, wherein the internal cavity of the ring opens out to the outside via at least one opening to enable resin to be injected into its inside.

10. A female annular connector for performing a method of connecting cables of a unitary pipe section that is to be assembled vertically to an undersea fluid transport pipe, the method comprising:

positioning around a low end of said unitary pipe section said female annular connector having connected thereto first cables extending along said unitary pipe section, said female annular connector including a plurality of bushings at a lower annular portion;

positioning around a high end of said fluid transport pipe a male annular connector having connected thereto second cables extending along said fluid transport pipe, said male annular connector including a plurality of pins at an upper annular portion; and connecting together said male annular connector and said female annular connector by rotationally aligning them with respect to each other such that the plurality of pins are received in the plurality of bushings, and sliding said male annular connector and said female annular connector vertically towards each other while assembling said unitary pipe section onto said fluid transport pipe, wherein said female annular connector comprises a ring having an internal cavity into which ends of said at least one of said first cables and said second cables for connection lead.

11. The female annular connector according to claim 10, wherein the internal cavity of the ring opens to the outside via at least one opening to enable resin to be injected into its inside.

12. The female annular connector according to claim 10, wherein the ring has at least one magnet on an inside face.

\* \* \* \* \*